United States Patent
Shimizu

(10) Patent No.: US 9,071,582 B2
(45) Date of Patent: Jun. 30, 2015

(54) COMMUNICATION APPARATUS, RECEPTION CONTROL METHOD, AND TRANSMISSION CONTROL METHOD

(75) Inventor: Takahiro Shimizu, Tokyo (JP)

(73) Assignee: LAPIS SEMICONDUCTOR CO., LTD., Yokohama (JP)

(*) Notice: Subject to any disclaimer, the term of this patent is extended or adjusted under 35 U.S.C. 154(b) by 248 days.

(21) Appl. No.: 13/611,618

(22) Filed: Sep. 12, 2012

(65) Prior Publication Data

US 2013/0086379 A1    Apr. 4, 2013

(30) Foreign Application Priority Data

Sep. 30, 2011    (JP) ................... 2011-217308

(51) Int. Cl.
*H04L 29/06* (2006.01)
*G06F 12/14* (2006.01)

(52) U.S. Cl.
CPC ........... *H04L 63/0485* (2013.01); *H04L 63/164* (2013.01); *H04L 69/22* (2013.01)

(58) Field of Classification Search
CPC .... H04L 63/0485; H04L 69/22; H04L 63/164
USPC .................................................. 713/160, 192
See application file for complete search history.

(56) References Cited

U.S. PATENT DOCUMENTS

| | | | |
|---|---|---|---|
| 7,017,042 B1 | 3/2006 | Ziai et al. | |
| 7,194,766 B2 | 3/2007 | Noehring et al. | |
| 7,996,670 B1* | 8/2011 | Krishna et al. | 713/162 |
| 2002/0191793 A1* | 12/2002 | Anand et al. | 380/255 |
| 2005/0256975 A1* | 11/2005 | Kaniz et al. | 709/250 |
| 2009/0319775 A1* | 12/2009 | Buer et al. | 713/153 |
| 2012/0117617 A1* | 5/2012 | Krupp et al. | 726/1 |

FOREIGN PATENT DOCUMENTS

| | | |
|---|---|---|
| JP | 2004-328359 A | 11/2004 |
| JP | 2004-349885 | 12/2004 |
| JP | 2006-140958 A | 6/2006 |
| JP | 2007-135035 | 5/2007 |

OTHER PUBLICATIONS

Japanese Office Action with translation dated Apr. 7, 2015.
Alberto Ferrante et al., "High-level Architecture of an IPSec-dedicated System on Chip", 3rd EuroNGI Conference on Next Generation Internet Networks, May 2007, pp. 159-166.

* cited by examiner

*Primary Examiner* — Linglan Edwards
*Assistant Examiner* — Forrest Carey
(74) *Attorney, Agent, or Firm* — Volentine & Whitt, PLLC

(57) ABSTRACT

Lookaside-type communication apparatus and reception and transmission control methods make high-rate communication of a packet including encrypted data. Receive data including encrypted data are supplied to an encryption data processing part, and supplied to a security part through a second bus when the packet is received. The encrypted data becomes plain-text data in the security part, and supplied to the control part through the system bus. Transmit data including a data body including a plain-text data to be encrypted are supplied to the security part when the packet is transmitted. The plain-text data become the encrypted data in the security part, and the transmit data having the data body including the encrypted data are supplied to the encryption data processing part through the second bus. The transmit data are transmitted in the form of the packet in the transmission and reception part.

11 Claims, 7 Drawing Sheets

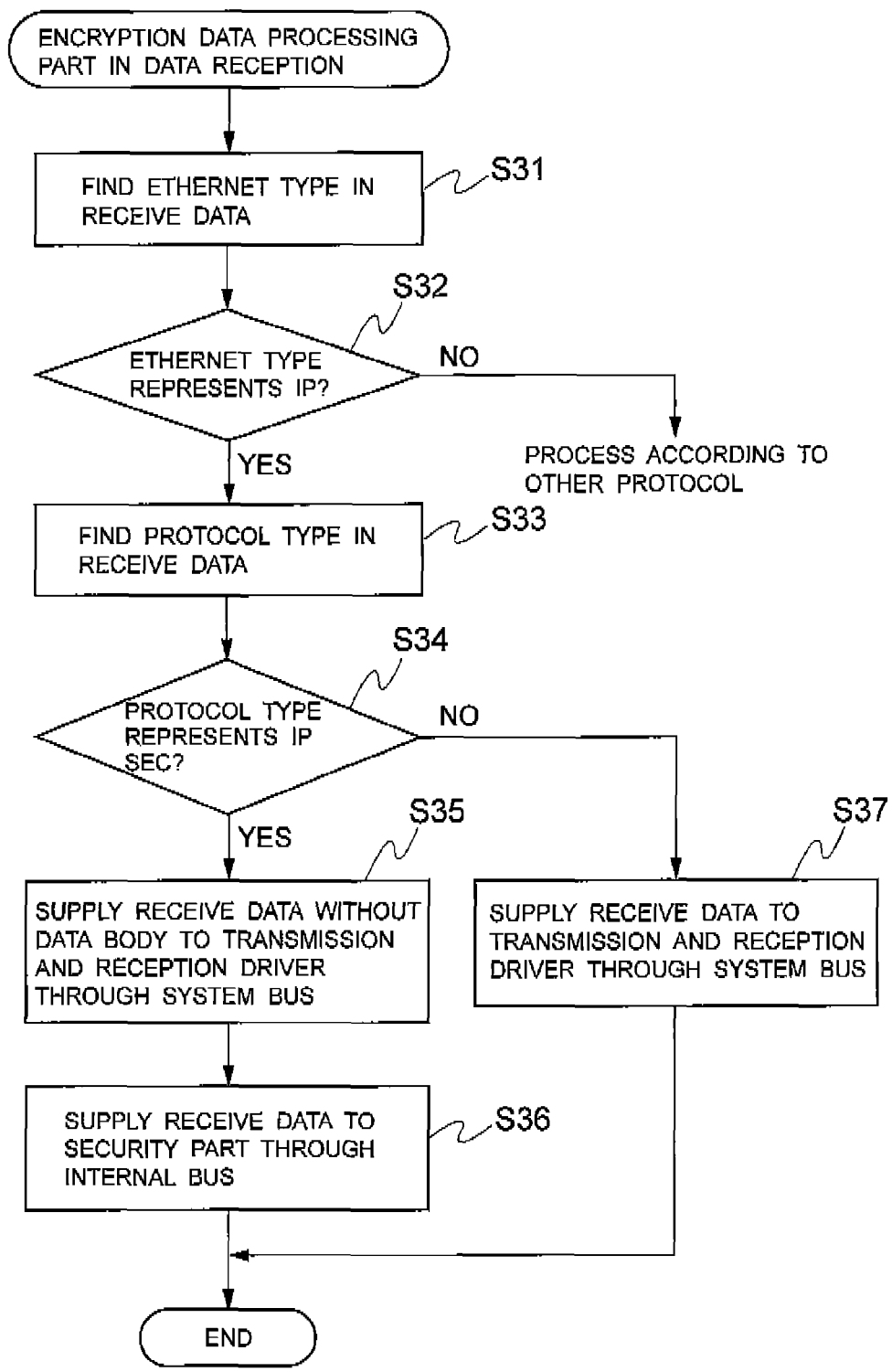

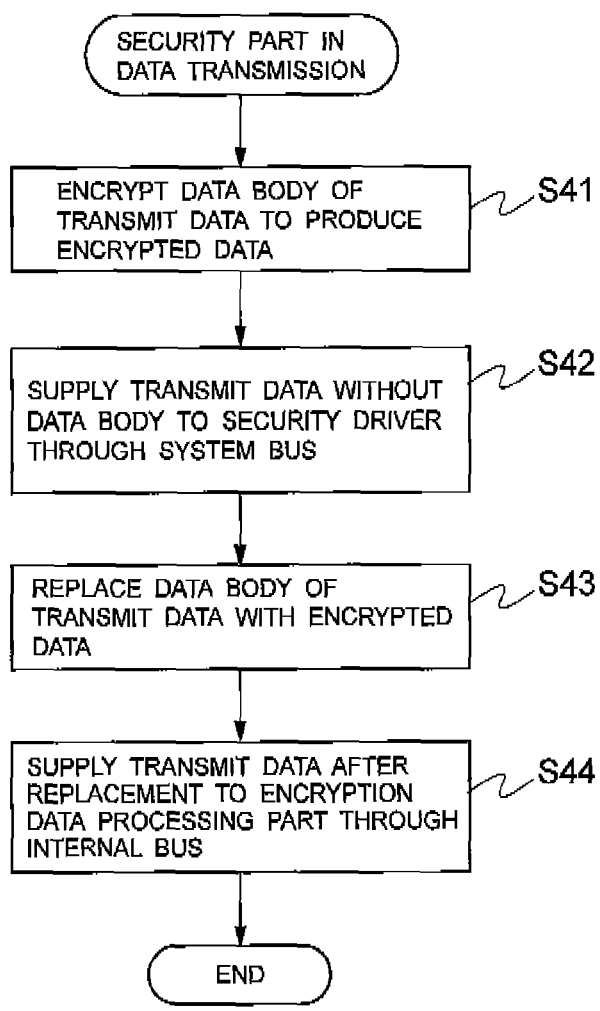

COMMUNICATION APPARATUS, RECEPTION CONTROL METHOD, AND TRANSMISSION CONTROL METHOD

BACKGROUND OF THE INVENTION

1. Technical Field

The present invention relates to a communication apparatus capable of transceiving a packet including encrypted data, a reception control method, and a transmission control method.

2. Background Art

In general, to prevent data leakage in packet communication, a transmitting side encrypts and transmits data included in a packet, and a receiving side decrypts encrypted data of the packet received therein. An IP sec (Security Architecture for Internet Protocol) is used as an encryption protocol for packet communication over the Internet. Recently, a lookaside-type communication apparatus is generally used as a communication apparatus employing the IP sec. As shown in FIG. 1, the lookaside-type communication apparatus has a structure in which a transmission and reception part 1 and a security part 2 are connected to a control part 3 through a system bus 4. The conventional device having the above structure is disclosed in patent literature 1 and patent literature 2.

The transmission and reception part 1 transmits and receives packets to and from a network 5, and the security part 2 encrypts data to be transmitted and decrypts encrypted data that have been received. The control part 3 controls the transmission and reception part 1 and the security part 2. When data are encrypted and transmitted in packet transmission, the control part 3 supplies the data to be transmitted to the security part 2 through the system bus 4, and the security part 2 encrypts the supplied data and returns the encrypted data to the control part 3 through the system bus 4. Thereafter, the control part 3 supplies transmit data including the encrypted data and a header to the transmission and reception part 1 through the system bus 4, and the transmission and reception part 1 makes the supplied transmit data in the form of a packet and transmits the packet toward an address of a destination within the network 5. When receive data are decrypted in packet reception, the receive data included in a packet received by the transmission and reception part 1 are supplied to the control part 3 through the system bus 4. If the receive data contains encrypted data, the control part 3 supplies the encrypted data to the security part 2 through the system bus 4. The security part 2 decrypts the encrypted data that have been supplied thereto, and returns the decrypted data, that is, plain-text data to the control part 3 through the system bus 4.

Patent Literature

PTL1: Japanese Patent Kokai No. 2004-349775
PTL2: Japanese Patent Kokai No. 2007-135035

SUMMARY OF THE INVENTION

However, in the conventional lookaside-type communication apparatus, when a packet including encrypted data is transmitted and when a packet including encrypted data is received, data exchange is required several times through the system bus 4 between the control part 3, and the transmission and reception part 1 and the security part 2. Accordingly, the bandwidth of the system bus 4 restricts the throughput for data transmission/reception of the communication apparatus, so that the communication of the packet including the encrypted data may not be made at a high rate.

The present invention has been made in view of the above problem, and an object of the present invention is to provide a lookaside-type communication apparatus capable of making the communication of a packet including encrypted data at a high rate, a reception control method, and a transmission control method.

In order to accomplish the above object, according to one aspect of the present invention, there is provided a communication apparatus including a transmission and reception part receiving a packet from a network and producing receive data, which include a header section and a data body, from the packet in a reception operation, and making transmit data, which include the header section and the data body, in a form of a packet and transmitting the packet to the network in a transmission operation, a security part decrypting the data body including at least encrypted data in the receive data, a control part connected to the transmission and reception part and the security part through a system bus, an encryption data processing part connected to the system bus, and a second bus connecting the encryption data processing part to the security part. The encryption data processing part supplies the receive data to the security part through the second bus when the data body of the receive data produced in the transmission and reception part includes encrypted data, and supplies the receive data to the control part through the system bus in the reception operation. The control part supplies a decryption command to the security part through the system bus together with the receive data including the data body having a reduced data volume when determining that the receive data supplied from the encryption data processing part include the encrypted data. The security part decrypts the encrypted data of the data body included in the receive data, which are supplied from the encryption data processing part through the second bus, according to the decryption command to make plain-text data, and supplies plain-text data to the control part through the system bus in response to an encryption command.

In order to accomplish the above object, according to another aspect of the present invention, there is provided a communication apparatus including a transmission and reception part receiving a packet from a network and producing receive data, which includes a header section and a data body, from the packet in a reception operation, and making transmit data, which includes the header section and the data body, in a form of a packet and transmitting the packet to the network in a transmission operation, a security part encrypting the data body including at least plain-text data in the transmit data, a control part connecting the transmission and reception part to the security part through a system bus, an encryption data processing part connected to the system bus, and a second bus connecting the encryption data processing part to the security part. The control part produces the transmit data and supplies an encryption command for the plain-text data to the security part through the system bus together with the transmit data in the transmission operation. The security part encrypts the plain-text data of the data body in the transmit data supplied from the control part according to the encryption command to make encrypted data, supplies the transmit data including the data body including the encrypted data to the encryption data processing part through the second bus after encrypting the plain-text data, and supplies the transmit data to the control part through the system bus in response to the encryption command. The control part supplies the transmit data including the data body having a data volume reduced in response to the encryption command to the encryption data processing part through the system bus together with a transmit command. The encryption data processing part supplies the transmit data including the data body having the reduced data volume, which are received from the control part, and the transmit data, which are received from the security part through the second bus according to the transmit command, to the transmission and reception part for packet transmission.

In order to accomplish the above object, according to another aspect of the present invention, there is provided a reception control method of a communication apparatus including a transmission and reception part receiving a packet from a network and producing receive data, which include a header section and a data body, from the packet during a reception operation, and making transmit data, which include the header section and the data body, in a form of a packet and transmitting the packet to the network during a transmission operation, a security part decrypting the data body including at least encrypted data in the receive data, a control part connected to the transmission and reception part and the security part through a system bus, an encryption data processing part connected to the system bus, and a second bus connecting the encryption data processing part to the security part. The reception control method includes a receive data supplying step of supplying the receive data from the encryption data processing part to the security part through the second bus when the data body of the receive data produced in the transmission and reception part includes encrypted data, and supplying the receive data from the encryption data processing part to the control part through the system bus during the reception operation, a decryption command issuing step of supplying a decryption command from the control part to the security part through the system bus together with the receive data including the data body having a reduced data volume when a determination is made that the receive data received to the control part include the encrypted data, and a decryption step decrypting the encrypted data of the data body included in the receive data, which are supplied from the encryption data processing par to the security part through the second bus, according to the decryption command to make plain-text data, and supplying plain-text data from the security part to the control part through the system bus in response to an encryption command.

In order to accomplish the above object, according to still another aspect of the present invention, there is provided a transmission control method of a communication apparatus including a transmission and reception part receiving a packet from a network and producing receive data, which includes a header section and a data body, from the packet during a reception operation, and making transmit data, which includes the header section and the data body, in a form of a packet and transmitting the packet to the network during a transmission operation, a security part encrypting the data body including at least plain-text data in the transmit data, a control part connecting the transmission and reception part to the security part through a system bus, an encryption data processing part connected to the system bus, and a second bus connecting the encryption data processing part to the security part. The transmission control method includes an encryption command issuing step of producing the transmit data and supplying an encryption command for the plain-text data to the security part through the system bus together with the transmit data in the control part during the transmission operation, an encryption step of encrypting the plain-text data of the data body in the transmit data supplied from the control part to the security part according to the encryption command to make encrypted data, supplying the transmit data including the data body including the encrypted data from the security part to the encryption data processing part through the second bus after encrypting the plain-text data, and supplying the transmit data to the control part through the system bus in response to the encryption command, a transmit command issuing step of supplying the transmit data including the data body having a data volume reduced in response to the encryption command from the control part to the encryption data processing part through the system bus together with a transmit command, and a transmit data supplying step of supplying the transmit data including the data body having the reduced data volume, which are supplied to the encryption data processing part from the control part, and the transmit data, which are supplied from the security part through the second bus according to the transmit command, from the encryption data processing part to the transmission and reception part for packet transmission.

As described above, according to the communication apparatus and the reception control method of the present invention, when a packet including encrypted data is received, the receive data including the encrypted data are supplied from the transmission and reception part to the encryption data processing part, and to the security part through the second bus. The encrypted data became the pain-text data in the security part, and the plain-text data are supplied to the control part through the system bus. In this case, the header section of the receive data is supplied from the control part to the security part through the system bus together with the decryption command in order to specify encrypted data to be decrypted, for example, the encrypted data to be decrypted, which are not supplied due to the removal thereof. Therefore, the volume of data passing through the system bus in packet reception can be reduced when comparing with that of the conventional device. Accordingly, the data reception throughput can be improved, so that the packet including the encrypted data can be received at a high rate.

In addition, according to the communication apparatus and the transmission control method of the present invention, when a packet including encrypted data is transmitted, the transmit data including the data body including the plain-text data to be encrypted are supplied from the control part to the security part through the system bus, and the plain-text data become the encrypted data in the security part. The transmit data including the data body including the encrypted data replaced from the plain-text data are supplied to the encryption data processing part through the second bus, and, furthermore, transmitted in the form of the packet by the transmission and reception part. In the packet transmission, the header section of the transmit data is supplied from the control part to the encryption data processing part through the system bus together with the transmit command in order to specify encrypted data to be transmitted, for example, the encrypted data to be transmitted, which are not supplied due to the removal. Therefore, the volume of data passing through the system bus in packet transmission can be reduced when comparing with that of the conventional device. Accordingly, the data transmission throughput can be improved, so that the packet including the encrypted data can be transmitted at a high rate.

BRIEF DESCRIPTION OF DRAWINGS

FIG. 8 is a flowchart showing the operation of the encryption data processing part when the communication apparatus of FIG. 2 receives data according to a second embodiment of the present invention; and FIG. 9 is a flowchart showing the operation of the security part when the communication apparatus of FIG. 2 transmits data according to a third embodiment of the present invention.

DETAILED DESCRIPTION OF INVENTION

Hereinafter, embodiments of the present invention will be described in detail with reference to accompanying drawings.

Figure 1:
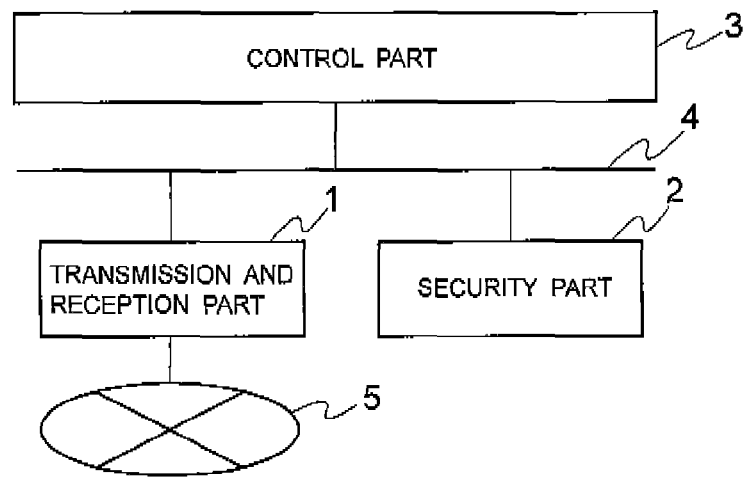
FIG. 1 is a block diagram showing the structure of a lookaside-type communication apparatus according to the related art.
Figure 2:
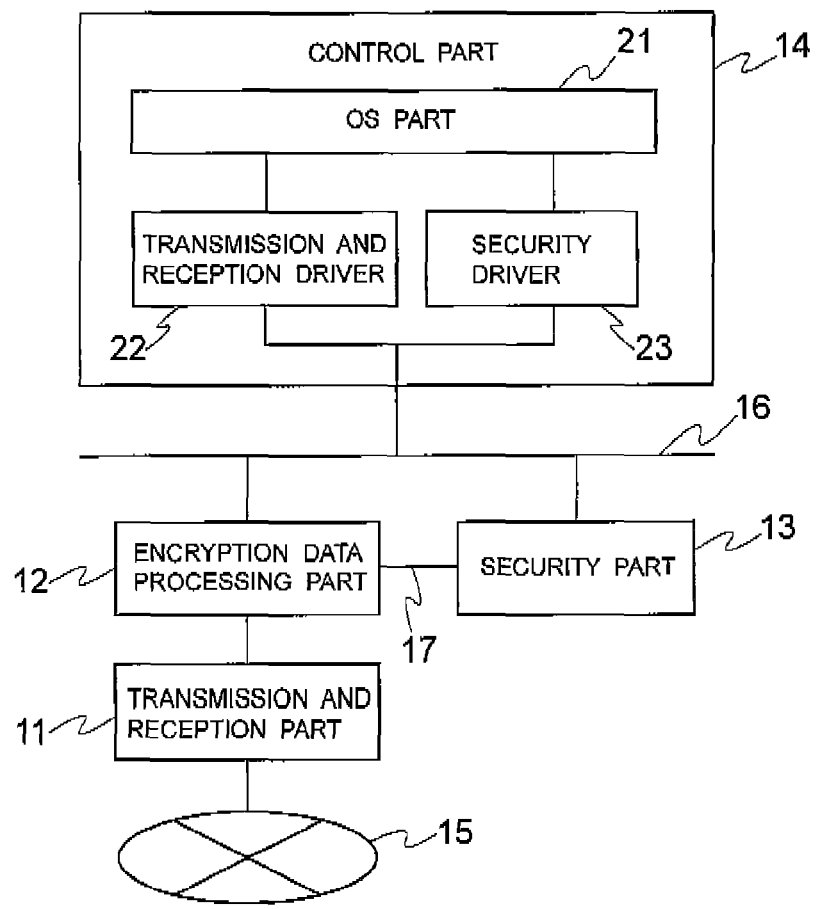
FIG. 2 is a block diagram showing the structure of a lookaside-type communication apparatus according to a first embodiment of the present invention.

FIG. 2 illustrates the structure of a lookaside-type communication apparatus according to a first embodiment of the present invention. The lookaside-type communication apparatus includes a transmission and reception part 11, an encryption data processing part 12, a security part 13, and a control part 14. The transmission and reception part 11 is connected to a network 15 based on Ethernet (registered trade mark), and the encryption data processing part 12, the security part 13, and the control part 14 are connected to each other through a system bus 16. For example, the system bus 16 is PCI Express BUS. In addition, the transmission and reception part 11 is connected to the encryption data processing part 12, and the encryption data processing part 12 is connected to the security part 13 through an internal bus 17 (second bus).

The transmission and reception part 11 transmits and receives packets over the network 15. In other words, the transmission and reception part 11 supplies receive data of the packet to the encryption data processing part 12 in the case of packet reception, and packets transmit data, which have been supplied from the encryption data processing part 12, in the case of packet transmission. The transmission and reception part 11 produces receive data based on the received packet so that data over the network 15 can be processed in the present communication apparatus. The encryption data processing part 12 is connected to the transmission and reception part 11. The encryption data processing part 12 determines if the receive data include encrypted data in the case of the packet reception. If the determination result represents that the receive data includes plain-text data (non-encrypted data), the receive data is supplied to the control part 14 through the system bus 16. If the determination result represents that the receive data includes encrypted data, the encryption data processing part 12 supplies the packet without an FCS to the control part 14 through the system bus 16 while supplying the packet without the FCS to the security part 13 through the internal bus 17. In addition, in the case of the packet transmission, the encryption data processing part 12 determines if a packet supplied from the control part 14 together with a transmit command is a packet for transmitting encrypted data. If the determination result represents that the packet is a packet of plain-text data, the encryption data processing part 12 supplies the packet to the transmission and reception part 11. If the determination result represents that the packet is a packet for encrypted data, since the packet does not contain the encrypted data at a data field thereof to be described later, the encryption data processing part 12 inserts the encrypted data, which is supplied from the security part 13 through the internal bus 17, into the packet and supplies the packet to the transmission and reception part 11.

When the transmission and reception part 11 receives a packet including encrypted data, the security part 13 receives the packet from the encryption data processing part 12 through the internal bus 17, and receives a packet, which has no data at a data field thereof, from the control part 14 together with a decryption command through the system bus 16. The security part 13 decrypts the encrypted data included in the packet supplied from the encryption data processing part 12 according to the decryption command, and supplies plain-text data to the control part 14 through the system bus 16. In addition, the security part 13 receives a packet including plain-text data, which have to be encrypted, together with an encryption command from the control part 14 through the system bus 16 when a packet including encrypted data is transmitted. The security part 13 encrypts the plain-text data according to the encryption command and supplies encrypted data to the control part 14 through the system bus 16.

The control part 14 is constructed by a CPU, and includes an operation system (OS) part 21, a transceive driver 22, and a security driver 23 as shown in FIG. 2. The OS part 21 operates an operation system according to an application program, which is not shown, and generates various commands while supplying data to be transmitted to the transceive driver 22 and the security driver 23. In addition, the OS part 21 receives receive data from the transceive driver 22, and receives encrypted data or decrypted plain-text data from the security driver 23. The transceive driver 22 supplies a command and transmit data, which are transferred from the OS part 21 to the transmission and reception part 11 or the encryption data processing part 12, to the encryption data processing part 12 through the system bus 16. The transceive driver 22 receives receive data from the encryption data processing part 12 through the system bus 16. The security driver 23 supplies a command and transmit data, which are transferred from the OS part 21 to the security part 13, to the security part 13 through the system bus 16. The security driver 23 receives encrypted data or plain-text data from the security part 13 through the system bus 16. The transceive driver 22 and the security driver 23 are formed by executing the application program.

Figure 3:
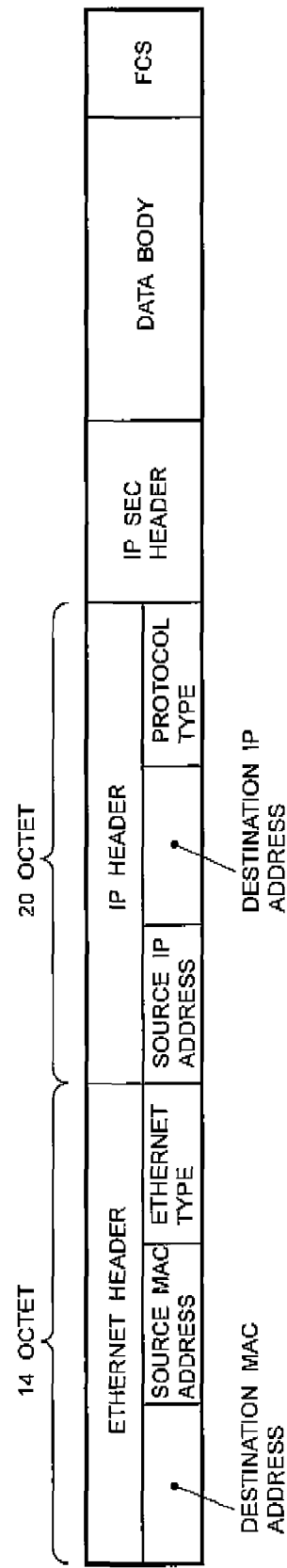
FIG. 3 is a view showing a data structure of a packet transmitted/received by the communication apparatus of FIG. 2.

The communication apparatus has a data structure shown in FIG. 3 when a transceived packet employs an Internet protocol over the Ethernet. An Ethernet header, an IP header, an IP sec header, a data body, and an FCS are positioned from the header of the packet. The Ethernet header includes a destination MAC address, a source MAC address, and an Ethernet type. The Ethernet type represents a protocol type used over the Ethernet. When an Ethernet type number is 0x800 or 0x86D, the protocol type represents an Internet protocol (IP).

The IP header includes at source IP address, a destination IP address, and a protocol type. The protocol type represents the type of an encryption protocol of data. When a protocol type number is 50 or 51, the encryption protocol is an IP sec. The FCS is an abbreviation of a frame check sequence, and is a checksum used to check if transceived data are correct.

In addition, according to the present description, each of transmit data and receive data refers to a data block including en Ethernet header, an IP header, an IP sec header, and a data body (encrypted data or plain-text data). A packet refers to a data block including an FCS in addition to the Ethernet header, the IP header, the IP sec header, and the data body. Further, a header section of the transmit data and the receive data refers to the Ethernet header, the IP header, and the IP sec header.

Hereinafter, the process operation of the communication apparatus when a packet is transceived will be described. First, in a receiving process of the packet, if the transmission and reception part 11 receives the packet from the network 5, the transmission and reception part 11 deploys the receive data in an internal memory (not shown).

Figure 4:
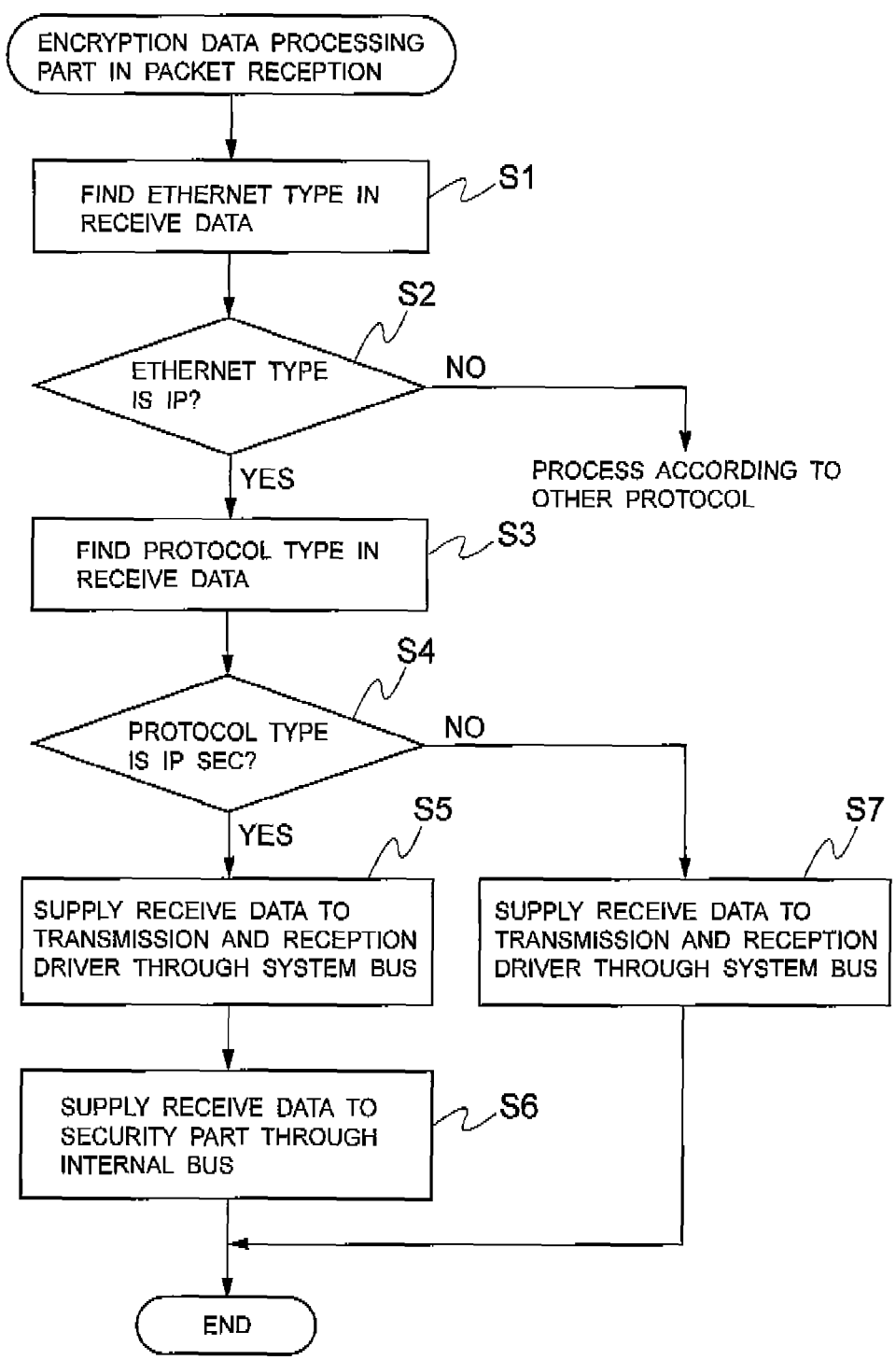
FIG. 4 is a flowchart showing the operation of an encryption data processing part when the communication apparatus of FIG. 2 receives data.

If the encryption data processing part 12 receives a signal representing packet reception from the transmission and reception part 11, the encryption data processing part 12 finds an Ethernet type of the Ethernet header included in the receive data stored in the internal memory (step S1), and determines if the Ethernet type represents an IP (step S2) as shown in FIG. 4. If the Ethernet type represents the IP, the encryption data processing part 12 finds a protocol type of the IP header (step S3), and determines if the protocol type represents an IP sec (step S4). For example, when the Ethernet header indicates 0x800, the IP is IPv4, and a protocol type is found at the $10^{th}$ octet of the IP header. In addition, when the Ethernet header indicates 0x86DD, the IP is IPv6, and a protocol type provided at the $7^{th}$ octet of the IP header is found. For example, if the protocol type is 50 or 51, data encrypted based on the IP sec protocol serve as a data body.

If the protocol type represents the IP sec, the encryption data processing part 12 reads the receive data stored in the internal memory, and supplies the receive data to the transceive driver 22 of the control part 14 through the system bus 16 (step S5). Then, the encryption data processing part 12 supplies the read receive data to the security part 13 through the internal bus 17 (step S6). Steps S5 and S6 correspond to steps of supplying the receive data.

In addition, if the protocol type does not represent the IP sec, the encryption data processing part 12 reads the receive data stored in the internal memory, and supplies the receive data to the transceive driver 22 of the control part 14 through the system bus 16 (step S7).

If the transceive driver 22 receives the receive data from the encryption data processing part 12 through the system bus 16, the receive data are transferred to the OS part 21. The OS part 21 receives plain-text data because the data body of the receive data is plain-text data if a determination is made that the protocol type of the receive data does not represent the IP sec. Meanwhile, if the determination is made that the protocol type of the receive data represents the IP sec, the OS part 21 supplies the receive data to the security driver 23 because the data body of the receive data is encrypted data.

The security driver 23 removes the data body of the encrypted data from the receive data, which are received from the OS part 21, and supplies a decryption command to the security part 13 through the system bus 16 together with the header section including the Ethernet header, the IP header, and the IP sec header of the receive data. The operation of the security driver 23 corresponds to a decryption command step. In addition, the security driver 23 may reduce the data volume of the data body through a reduction process such as a transformation instead of removing the data body of the encrypted data from the receive data, and may supply the receive data having the data body reduced in the data volume to the security part 13 through the system bus 16 together with the decryption command.

Figure 5:
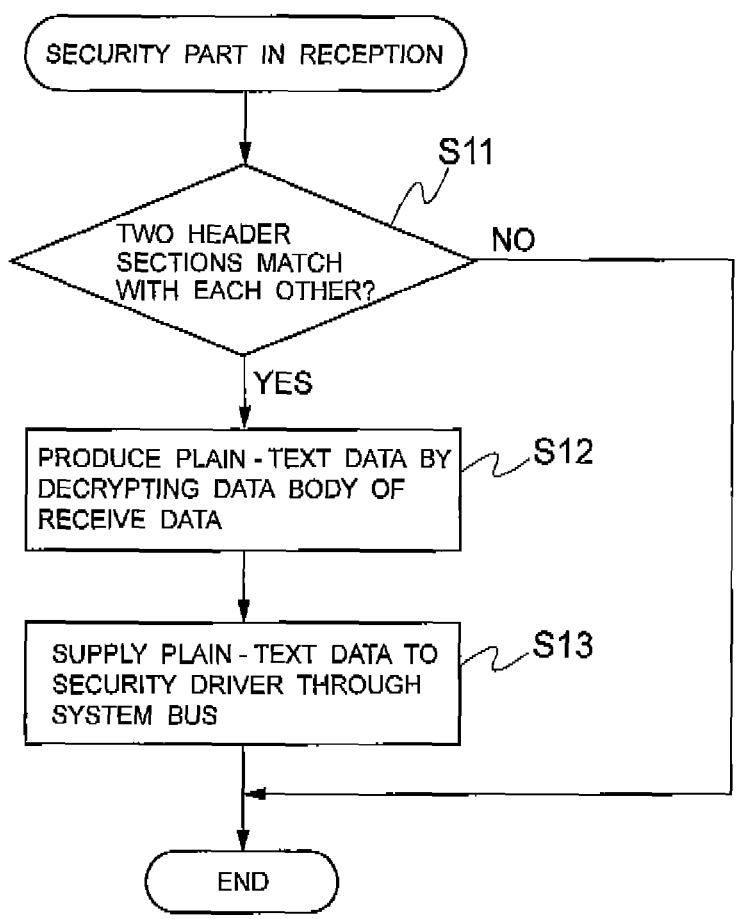
FIG. 5 is a flowchart showing the operation of a security part when the communication apparatus of FIG. 2 receives data.

If the security part 13 receives the decryption command, the security part 13 determines if the header section of the receive data received therein from the encryption data processing part 12 through the internal bus 17 matches with the header section received therein together with the decryption command by combining the two header sections (step S11) as shown in FIG. 5. If the two header sections match with each other, the security part 13 decrypts the encrypted data of the data body included in the receive data to produce plain-text data (step S12). Then, the plain-text data are output to the security driver 23 through the system bus 16 (step S13). The steps S12 and S13 correspond to the decryption step.

In addition, if the security driver 23 receives the plain-text data from the security part 13, the security driver 23 replaces the data body of the receive data, which have been received from the OS part 21 for the decryption purpose, with the plain-text data, and returns the receive data subject to the replacement to the OS part 21. Through the above steps, the reception process of the communication apparatus has been finished. In addition, the security part 13 not only returns only the plain-text data to the security driver 23, but returns the receive data including the data body having the plain-text data subject to the replacement to the security driver 23 through the system bus 16.

Thereafter, when plain-text data are encrypted and transmitted in the transmission process of the packet, the OS part 21 produces transmit data in which the plain-text data is included in the data body and supplies the transmit data to the security driver 23.

The security driver 23 supplies the encryption command and the transmit data, which have been received from the OS part 21, to the security part 13 through the system bus 16. The operation of the security driver 23 corresponds to an encryption command step.

Figure 6:
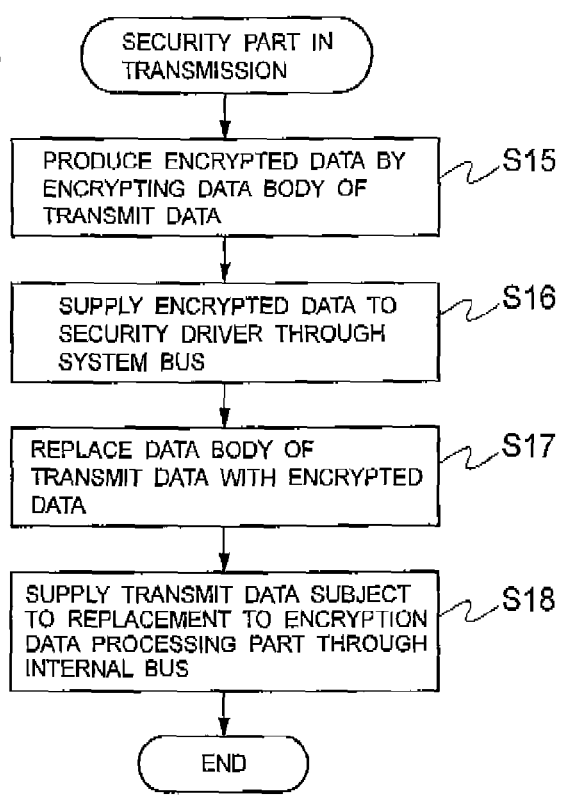
FIG. 6 is a flowchart showing the operation of a security part when the communication apparatus of FIG. 2 transmits data.

If the security part 13 receives the encryption command and the transmit data, the security part 13 produces encrypted data by encrypting the plain-text data of the data body included in the transmit data (step S15) as shown in FIG. 6. Thereafter, the security part 13 outputs the encrypted data to the security driver 23 through the system bus 16 (step S16). In addition, the security part 13 replaces the data body of the transmit data, which are received from the security driver 23 together with the encryption command, with the encrypted data (step S17), and supplies the transmit data, which has been subject to the replacement, to the encryption data processing part 12 through the internal bus 17 (step S18). The steps S15 to S18 correspond to the encryption steps.

In addition, if the security driver 23 receives the encrypted data from the security part 13, the security driver 23 replaces the data body of the transmit data received from the OS part 21 for the encryption purpose with the encrypted data, and returns the transmit data, which has been subject to the replacement, to the OS part 21. In addition, the security part 13 may return the transmit data having the encrypted data to the security driver 23 through the system bus 16.

If the OS part 21 receives the transmit data having the data body including the encrypted data, the OS part 21 supplies the transmit data to the transceive driver 22. The transceive driver 22 removes the data body of the encrypted data from the transmit data, and supplies the transmit data having only the header section including the Ethernet header, the IP header, and the IP sec header to the encryption data processing part 12 through the system bus 16 together with the transmit command. The operation of the transceive driver 22 corresponds to the transmit command step. In addition, the transceive driver 22 may reduce the data volume of the data body through a reduction process such as a transformation instead of removing the data body of the encrypted data from the transmit data, and may supply the transmit data having the data body reduced in the data volume to the encryption data processing part 12 through the system bus 16 together with the transmit command.

Figure 7:
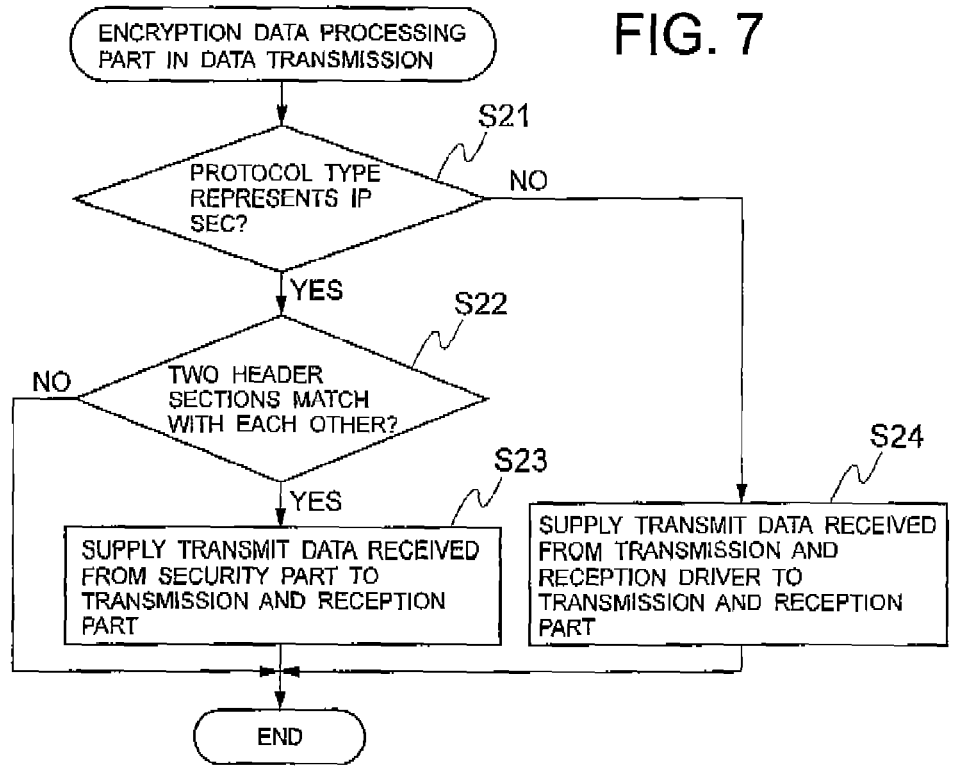
FIG. 7 is a flowchart showing the operation of the encryption data processing part when the communication apparatus of FIG. 2 transmits data.

If the encryption data processing part 12 receives the transmit command and the transmit data from the transceive driver 22, the encryption data processing part 12 determines if the protocol type of the transmit data represents the IP sec (step S21) as shown in FIG. 7. If the protocol type of the transmit data represents the IP sec, the encryption data processing part 12 determines if the header section of the transmit data received from the security part 13 through the internal bus 17 matches with the header section of the transmit data received according to the transmit command, by combining the two header sections (step S22). If the two header sections match with each other, the encryption data processing part 12 supplies the transmit data, which have been received from the security part 13 through the internal bus 17, to the transmission and reception part 11 (step S23). If the two header sections does not match with each other, the transmit data are not supplied to the transmission and reception part 11. Steps S22 and S23 correspond to transmit data supply steps.

If the protocol type of the transmit data from the transceive driver 22 does not represent the IP sec according to the determination result in step S21, the transmit data is supplied to the transmission and reception part 11 (step S24).

The transmission and reception part 11 forms a packet by adding the FCS to the transmit data which have been received from the encryption data processing part 12, and transmits the packet to the network 15.

As described above, when a packet including encrypted data is received, receive data of the encrypted data are supplied from the transmission and reception part 11 to the encryption data processing part 12, and supplied from the encryption data processing part 12 to the security part 13 through the internal bus 17. The encrypted data are decrypted to plain-text data in the security part 13, and the plain-text data are supplied to the security driver 23 of the control part 14 through the system bus 16. In this case, encrypted data to be decrypted are not directly supplied from the security driver 23 of the control part 14 to the security part 13 through the system bus 16, but only a header section of the receive data, which is used to specify the encrypted data to be decrypted, is supplied together with a decryption command from the security driver 23 of the control part 14 to the security part 13 through the system bus 16. Therefore, the volume of data passing through the system bus 16 in the packet reception can be more reduced when comparing with that of the conventional device.

In addition, when a packet including encrypted data is transmitted, transmit data including plain-text data to be encrypted are supplied from the security driver 23 of the control part 14 to the security part 13 through the system bus 16, and the plain-text data become the encrypted data in the security part 13. The transmit data having the encrypted data replaced from the plain-text data, are supplied to the encryption data processing part 12 through the internal bus 17, and transmitted in the form of the packet by the transmission and reception part 11. In the above packet transmission, encrypted data are not directly supplied from the transceive driver 22 of the control part 14 to the encryption data processing part 12 through the system bus 16, but only a header section of the transmit data used to specify the encrypted data to be transmitted is supplied together with the transmit command from the transceive driver 22 of the control part 14 to the encryption data processing part 12 through the system bus 16. Therefore, the volume of data passing through the system bus 16 even in the packet transmission can be more reduced when comparing with that of the conventional device.

As a result, the volume of data passing through the system bus 16 can be reduced in the packet transmission/reception, so that the throughput of the data transmission/reception can be improved. Accordingly, the communication for the packet including the encrypted data can be made at a high rate.

FIG. 8 is a flowchart showing the operation of the encryption data processing part in a reception operation according to a second embodiment of the present invention. In a data receiving operation, if the encryption data processing part 12 receives a signal representing the reception of a packet from the transmission and reception part 11, the encryption data processing part 12 finds the Ethernet type of the Ethernet header included in receive data stored in the internal memory (step S31), and determines if the Ethernet type represents an IP (step S32). If the Ethernet type represents the IP, the encryption data processing part 12 finds the protocol type of the IP header (step S33) and determines if the protocol type represents the IP sec (step S34). Steps S31 to S34 are the same as steps S1 to S4.

If the protocol type represents the IP sec, the encryption data processing part 12 reads the receive data stored in the internal memory, removes the data body of encrypted data from the receive data, and supplies the receive data (having no encrypted data) having only the header section including the Ethernet header, the IP header, and the IP sec header to the transceive driver 22 through the system bus 16 (step S35). In addition, the read receive data (having encrypted data) are supplied to the security part 13 through the internal bus 17 (step S36). In addition, the encryption data processing part 12 reads the receive data stored in the internal memory if the protocol type does not represent the IP sec, and supplies the read receive data to the transceive driver 22 of the control part 14 through the system bus 16 (step S37).

Even if the transceive driver 22 receives the receive data without the encrypted data supplied from the encryption data processing part 12 according to the operation in step S35, the transceive driver 22 operates similarly to an operation of receiving the receive data having encrypted data transmitted from the encryption data processing part 12, the encryption data processing part 12 supplies the receive data to the OS part 21.

As described above, when a packet including encrypted data is received in the communication operation to perform the reception operation of FIG. 8, the receive data having the encrypted data are supplied from the transmission and reception part 11 to the encryption data processing part 12, and supplied to the security part 13 through the internal bus 17. In this case, the encrypted data become plain-text data in the security part 13, and the plain-text data are supplied to the security driver 23 of the control part 14 through the system bus 16. Meanwhile, the transceive part 22 of the control part 14 does not receive the encrypted data from the encryption data processing part 12 through the system bus 16, but receives only a header section of the receive data to specify the received encrypted data. Accordingly, the security part 13 receives only the header section from the security driver 23 of the control part 14 through the system bus 16. Therefore, the data body passing through the system bus 16 in packet reception has only decrypted plain-text data supplied from the security part 13 to the security driver 23. Accordingly, the volume of data passing through the system bus 16 can be more reduced when comparing with that of the conventional device.

FIG. 9 illustrates the transmission operation of the security part 13 according to the third embodiment of the present invention. According to the transmission operation, if the security part 13 receives an encryption command and transmit data from the security driver 23 through the system bus 16, the security part 13 encrypts the plain-text data of the data body included in the transmission data and produces encrypted data (step S41). In addition, the security part 13 allows only the header section including an Ethernet header, the IP header, and the IP sec header to contain in the transmit data received therein from the security driver 23 together with the encryption command, and outputs the transmit data without the encrypted data to the security driver 23 through the system bus 16 (step S42). In addition, the security part 13 replaces the data body of the transmit data, which are received together with the encryption command, with the encrypted data (step S43). Then, the security part 13 supplies the transmit data (transmit data having the encrypted data), which have been subject to the replacement, to the encryption data processing part 12 through the internal bus 17 (step S44).

In addition, if the security driver 23 receives the transmit data without the encrypted data from the security part 13, the security driver 23 returns the transmit data having plain-text data, which have been received from the OS part 21 for the encryption purpose, to the OS part 21. The OS part 21 determines that the transmit data having the encrypted data are made based on the return of the transmit data having the plain-test data, and supplies the transmit data having the plain-text data to the transceive driver 22. Thereafter, the operations of the transceive driver 22, the encryption data processing part 12, and the transmission and reception part 11 are the same as the operations thereof in the packet transmission according to the first embodiment.

As described above, when a packet including encrypted data is transmitted in the communication apparatus to perform the transmission operation of FIG. 9, the transmit data having plain-text data to be encrypted are supplied from the security driver 23 of the control part 14 to the security part 13 through the system bus 16. The plain-text data become the encrypted data in the security part 13, and the transmit data having the encrypted data replaced from the plain-text data are supplied to the encryption data processing part 12 through the internal bus 17. In addition, the transmit data without the encrypted data are supplied from the security part 13 to the security driver 23 through the system bus 16 in order to notify the OS part 21 of the encryption termination. Further, only the header section of the transmit data to specify the encrypted data to be transmitted is supplied together with a transmit command from the transceive driver 22 to the encryption data processing part 12 through the system bus 16. Therefore, in the packet transmission, the data body passing through the system bus 16 includes only the plain-text data to be encrypted, which have been supplied from the security driver 23 to the security part 13. Accordingly, the volume of data passing through the system bus 16 in the packet reception can be more reduced when comparing with that of the conventional device.

In addition, although the embodiment has been described in that the network 15 includes the Ethernet, the present invention is applicable to the connection to a network other than the Ethernet.

Although the encryption data processing part 12 is provided separately from the transmission and reception part 11, the encryption data processing part 12 may be provided in the transmission and reception part 11.

In addition, although the volume of data passing through the system bus 16 can be more reduced in both of the packet reception and the packet transmission when comparing with that of the conventional device according to the embodiment, the present invention is applicable to one of the packet reception case and the packet transmission case because the volume of data passing through the system bus can be reduced even in one of the packet reception case and the packet transmission case.

This application is based on Japanese Patent Application No. 2011-217308 which is herein incorporated by reference.

What is claimed is:

1. A communication apparatus comprising:
   a transmission and reception part receiving a packet from a network and producing receive data which includes a header section and a data body on the basis of the received packet in a reception operation, and making a packet on the basis of a transmit data which includes a header section and a data and transmitting the packet to the network in a transmission operation;
   a security part decrypting the data body including at least encrypted data in the receive data;
   a control part connected to the transmission and reception part and the security part through a system bus;
   an encryption data processing part connected to the system bus; and
   a second bus connecting the encryption data processing part to the security part and being different and separated from said system bus,
   wherein the encryption data processing part supplies the receive data to the security part through said second bus when the data body of the receive data produced in the transmission and reception part includes encrypted data, and supplies the receive data to the control part through the system bus in the reception operation,
   the control part supplies a decryption command to the security part through the system bus together with the receive data while reducing in volume said data body of the receive data when determining that the receive data supplied from the encryption data processing part include the encrypted data, and
   the security part decrypts the encrypted data of the data body included in the receive data, which are supplied from the encryption data processing part through said second bus, according to the decryption command to make plain-text data, and supplies the plain-text data to the control part through the system bus in response to an encryption command.

2. The communication apparatus of claim 1, wherein the header section of the receive data includes information representing whether the data body of the receive data includes the encrypted data, and
   wherein the control part comprises:
   a transceive driver receiving the receive data supplied from the encryption data processing part through the system bus;
   an operation system (OS) part determining if the receive data received by the transceive driver include the encrypted data according to the header section in the receive data; and
   a security driver supplying the decryption command to the security part through the system bus together with the receive data without the data body when a determination is made that the receive data include the encrypted data by the OS part, and receiving the plain-text data from the security part through the system bus in response to the encryption command.

3. The communication apparatus of claim 2, wherein operations of the transceive driver and the security driver are performed according to an application program included in the OS part.

4. The communication apparatus of claim 2, wherein the encryption data processing part determines whether the data body in the receive data produced in the transmission and reception part includes the encrypted data based on the header section in the receive data, and supplies the receive data without the data body to the transceive driver through the system bus if the data body includes the encrypted data.

5. The communication apparatus of claim 2, wherein the security part decrypts the encrypted data into the plain-text data after determining if the header section in the receive data, which are supplied from the security driver together with the decryption command, matches with the header section in the receive data supplied from the encryption data processing part by combining the two header sections with each other.

6. A communication apparatus comprising:
a transmission and reception part receiving a packet from a network and producing a receive data which includes a header section and a data body on the basis of the received packet in a reception operation, and making a packet on the basis of a transmit data which includes a header section and a data body and transmitting the packet to the network in a transmission operation;
a security part encrypting the data body including at least plain-text data in the transmit data;
a control part connecting the transmission and reception part to the security part through a system bus;
an encryption data processing part connected to the system bus; and
a second bus connecting the encryption data processing part to the security part, and being different from said system bus,
wherein the control part produces the transmit data and supplies an encryption command for the plain-text data to the security part through the system bus together with the transmit data in the transmission operation,
the security part encrypts the plain-text data of the data body in the transmit data supplied from the control part according to the encryption command to make encrypted data, supplies the transmit data including the data body including the encrypted data to the encryption data processing part through said second bus after encrypting the plain-text data, and supplies the transmit data to the control part through the system bus in response to the encryption command,
the control part supplies the transmit data while reducing in volume said data body of the transmit data in response to the encryption command to the encryption data processing part through the system bus together with a transmit command, and
the encryption data processing part supplies the transmit data including the data body having the reduced data volume, which are received from the control part, and the transmit data, which are received from the security part through said second bus according to the transmit command, to the transmission and reception part for packet transmission.

7. The communication apparatus of claim 6, wherein the header section of the transmit data includes information representing whether the data body of the transmit data includes the encrypted data, and wherein the control part comprises:
an operation system (OS) part determining if the transmit data includes plain-text data to be encrypted based on the header section in the transmit data;
a security driver supplying the encryption command to the security part through the system bus together with the transmit data when a determination is made that the transmit data includes the plain-text data to be encrypted by the OS part, receiving the encrypted data from the security part through the system bus in response to the encryption command, and supplying the encrypted data to the OS part; and
a transceive driver removing the data body from the transmit data received from the OS part, and supplying the transmit data without the data body to the encryption data processing part through the system bus together with the transmit command.

8. The communication apparatus of claim 7, wherein operations of the transceive driver and the security driver are performed according to an application program included in the OS part.

9. The communication apparatus of claim 7, wherein the security part supplies the transmit data without the data body to the security driver through the system bus in response to the encryption command.

10. The communication apparatus of claim 7, wherein the encryption data processing part supplies the transmit data received from the security part to the transmission and reception part for packet communication after determining if the header section of the transmit data without the data body, which are received from the control part together with the transmit command, matches with the header section of the transmit data, which are received from the security part through said second bus, by combining the two header sections with each other.

11. A reception control method of a communication apparatus including a transmission and reception part receiving a packet from a network and producing a receive data which includes a header section and a data body on the basis of the received packet during a reception operation, and making a packet on the basis of a transmit data which includes a header section and a data body and transmitting the packet to the network during a transmission operation, a security part decrypting the data body including at least encrypted data in the receive data, a control part connected to the transmission and reception part and the security part through a system bus, an encryption data processing part connected to the system bus, and a second bus connecting the encryption data processing part to the security part and being different and separated from said system bus, the reception control method comprising:
a receive data supplying step of supplying the receive data from the encryption data processing part to the security part through said second bus when the data body of the receive data produced in the transmission and reception part includes encrypted data, and supplying the receive data from the encryption data processing part to the control part through the system bus during the reception operation;
a decryption command issuing step of supplying a decryption command from the control part to the security part through the system bus together with the receive data while reducing in volume said data body of the receive data when a determination is made that the receive data received to the control part include the encrypted data; and
a decryption step decrypting the encrypted data of the data body included in the receive data, which are supplied from the encryption data processing part to the security part through said second bus, according to the decryption command to make plain-text data, and supplying plain-text data from the security part to the control part through the system bus in response to an encryption command.

* * * * *